United States Patent Office.

HENRY F. TAYLOR, OF NEATH AND BRITON FERRY, COUNTY OF GLAMORGAN, AND GEORGE LEYSHON, OF TIVIDALE, COUNTY OF STAFFORD, ASSIGNORS TO TAYLOR, STRUVÉ, EATON & PRICE, OF NEATH AND BRITON FERRY, SOUTH WALES, ENGLAND.

PROCESS OF MANUFACTURING FLUXES.

SPECIFICATION forming part of Letters Patent No. 332,458, dated December 15, 1885.

Application filed November 24, 1883. Serial No. 112,741. (No specimens.) Patented in England April 20, 1883, No. 2,012; in France June 22, 1883, No. 151,893; in Belgium July 16, 1883, No. 61,822, and in Canada October 3, 1883, No. 17,826.

*To all whom it may concern:*

Be it known that we, HENRY FRANCIS TAYLOR, of the firm of TAYLOR, STRUVÉ, EATON & PRICE, of Neath and Briton Ferry, both in the county of Glamorgan, South Wales, mechanical engineers, and GEORGE LEYSHON, of Tividale, in the county of Stafford, England, tin-house superintendent, have invented an improvement in the process of manufacturing fluxes or material used in the preparation of plates to be coated with tin, terne, and other metals, of which the following is a specification, the invention having been patented in England April 20, 1883, No. 2,012; in France June 22, 1883, No. 151,893; in Belgium, deposited June 25, 1883, granted July 16, 1883, No. 61,822, and in Canada October 3, 1883, No. 17,826.

Heretofore attempts have been made to produce a flux for the preparation of tin plates from muriatic acid and spelter; but this material, after a time, has been found to eat into the iron, causing defects to appear on the surface of the plates, and consequently to reduce their value. Now, according to our invention we treat muriatic acid and spelter or zinc in such manner that the injurious properties are removed from the acid, and the plates after coating are not liable to deterioration, as heretofore.

According to our invention we take spirits of salts or muriatic acid, and place the same in an earthenware or other pan of convenient size to contain the required quantity, and a sufficient amount of spelter or zinc is put into the acid to neutralize the acid. During this process of neutralizing or boiling more spelter or zinc may, if required, be added to the acid until the boiling ceases. We ascertain whether more zinc or spelter is required by trying if all that which was put in has been dissolved or not. In the former case we add more until there is a surplus of undissolved zinc or spelter; or the muriatic acid and spelter or zinc may, at this stage of the process, be further boiled by the action of fire on the caldron or pot. We then let the solution rest and settle, after which it is emptied into a receptacle. To the solution of chloride of zinc thus far carefully prepared a quantity of charcoal and lime or chalk or magnesia, or the carbonates of any other of the alkaline earths, is or are added; but we know of no such carbonates, except those of lime and magnesia, that are suitable because of cost. The solution with the charcoal and lime or its equivalent are well mixed together, and then allowed to settle, and when clear the liquid is run off. All acid and corrosive properties being thus removed, it is ready for use. The lime serves to neutralize any remaining free acid, and insures the absolute neutralization of the flux—a most vital point in the practical use of this flux. The charcoal has apparently the office of assisting the precipitation of the lime, and is useful because of the uncertainty of the quality of the lime as commercially obtained.

Sometimes during the boiling action of the muriatic acid and the spelter or zinc we set fire to the gases which escape until the burning qualities or gases are exhausted or consumed.

In using this material as a flux we pour a small quantity of grease on the surface of the molten metal, and then add a sufficient quantity of the composition treated in the manner we have before described, although, in some cases, the grease may be altogether dispensed with.

The aforesaid flux is especially suitable for and used with a flux-box and tinning-pot described in our patent application filed August 11, 1883, No. 103,479, the result being that the plate is coated and finished by one operation and in one pot.

We are aware that it has heretofore been proposed to make a flux of chloride of zinc and chloride of potassium; also to make a flux of chloride or sulphate of zinc with other substances—such as carbonate of soda or common salt, or chloride of lead and manganese; but such fluxes are quite unsuitable, as has been amply proved by experience.

We claim as our invention—

The method herein specified of preventing injury to iron plates, coated with tin or other metal, from the traces of acid remaining in the flux employed, consisting in mixing with the muriate-of-zinc flux a material—such as lime, chalk, or magnesia—having a great affinity for the acid, so as to remove any traces of free acid, and immersing the plates in such flux previous to applying the coating metal, substantially as set forth.

H. F. TAYLOR.
GEO. LEYSHON.

Witnesses:
 HENRY WILLIAMS,
  41 *Alfred Street, Neath, Solicitor's Clerk.*
 WALTER P. NICHOLAS,
  64 *Windsor Road, Neath, Solicitor's Clerk.*